United States Patent [19]
Nishimura et al.

[11] Patent Number: 5,912,517
[45] Date of Patent: Jun. 15, 1999

[54] COIL COMPONENTS AND MOTOR USING THE COIL COMPONENTS HAVING A TERMINAL PIN WITH A CONDUCIVE CONNECTION MEMBER WOUND THERE AROUND

[75] Inventors: Kiyoshi Nishimura; Toshio Yamamoto; Takeshi Hattori, all of Nagano, Japan

[73] Assignee: Sankyo Seiki Mfg Co., Ltd., Nagano-ken, Japan

[21] Appl. No.: 08/801,261

[22] Filed: Feb. 19, 1997

[30] Foreign Application Priority Data

Feb. 21, 1996 [JP] Japan ................................. 8-058550

[51] Int. Cl.⁶ ............................... H02K 3/00; H01R 4/00
[52] U.S. Cl. .......................... 310/71; 310/208; 174/84 R; 174/94 R
[58] Field of Search ...................... 310/194, 162, 310/164, 71, 208, 179; 174/84 R, 94 R; 439/884, 874, 790

[56] References Cited

U.S. PATENT DOCUMENTS

| | | | |
|---|---|---|---|
| 4,422,711 | 12/1983 | Wolowicz | 339/252 R |
| 4,825,112 | 4/1989 | Mineyama | 310/71 |
| 5,057,732 | 10/1991 | Fukaya | 310/208 |
| 5,214,331 | 5/1993 | Yonei | 310/71 |
| 5,389,846 | 2/1995 | Okazaki et al. | 310/40 MM |
| 5,487,686 | 1/1996 | Sawada | 439/884 |
| 5,569,883 | 10/1996 | Walter et al. | 174/84 R |

*Primary Examiner*—Nestor Ramirez
*Assistant Examiner*—Tran N. Nguyen
*Attorney, Agent, or Firm*—McAulay Nissen Goldberg Kiel & Hand, LLP

[57] ABSTRACT

A coil component comprises a wire, a terminal pin around which an end of the wire is wound, a terminal section for fixing one end of the terminal pin and for allowing the terminal pin to project therefrom. A conductive connection member is connected to the terminal pin so that it can be electrically connected to the wire. The terminal pin has a diameter on an open side thereof which is formed larger than that on a root side form which the conductive connection member is drawn out. The pin is formed as a contact section with which the conductive connection member makes contact when it is pulled in a projection direction of the terminal pin.

8 Claims, 6 Drawing Sheets

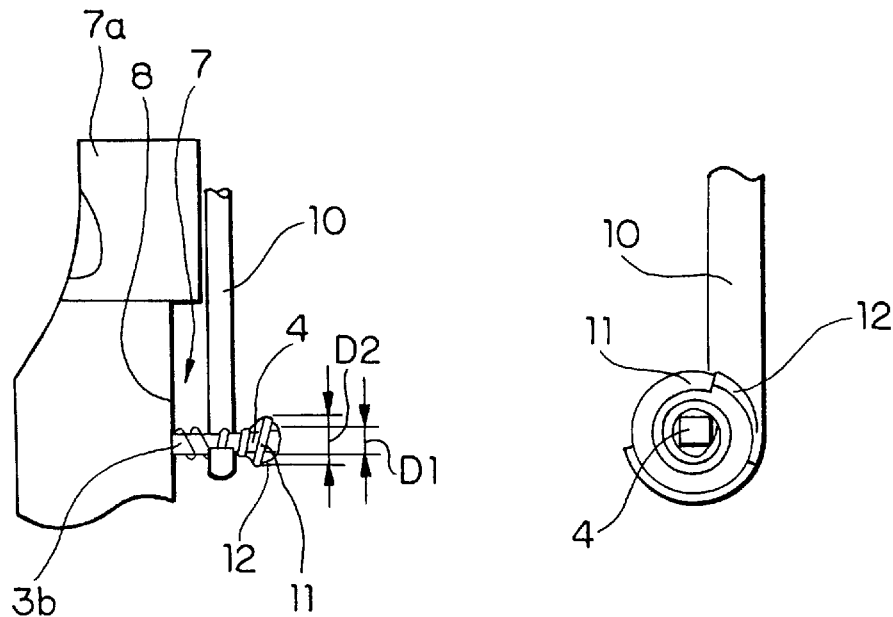
FIG. 3A
FIG. 3B
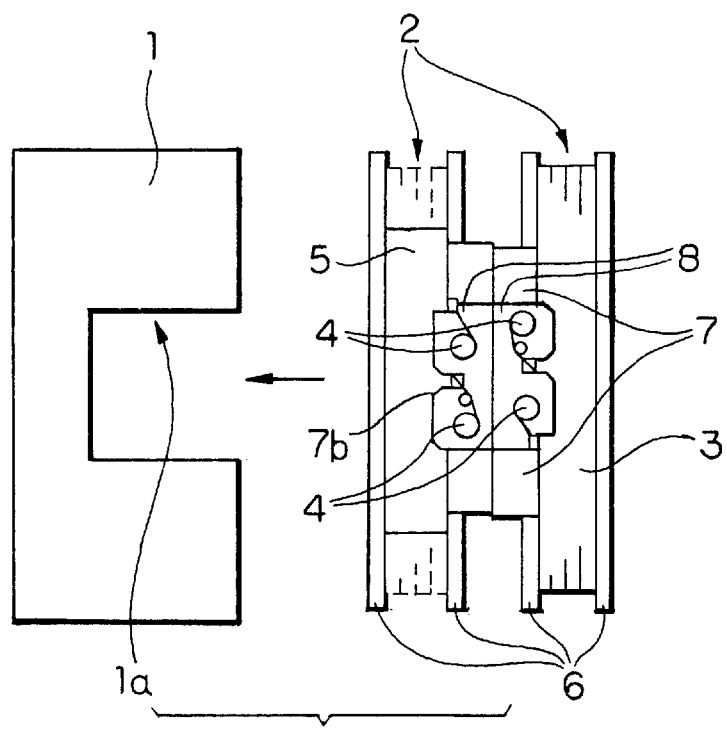
FIG. 4

COIL COMPONENTS AND MOTOR USING THE COIL COMPONENTS HAVING A TERMINAL PIN WITH A CONDUCIVE CONNECTION MEMBER WOUND THERE AROUND

BACKGROUND OF THE INVENTION a) Field of the Invention

This invention relates to a coil component for storing wire of, for example, a motor, and a motor using the coil component.

b) Description of the Related Art

A stepping motor 30 shown in FIG. 10 is known conventionally. Installed in the stepping motor 30 are two coil bobbins 31 and 31 which are arranged back to back. Note that a terminal section 33, which is made by burying the edge of a metallic terminal pin 32, is provided to each of the coil bobbins 31 as shown in FIG. 10. The terminal section 33 is provided on a periphery of one of a pair of flanges formed at both ends of a bobbin spool around which the wire is wound.

As shown in FIG. 11, the end 34 of the wire is wound around the terminal pin 32, and a core 36 (a continuity section of the lead 35 which is a conductive connection member to be electrically connected to the wire) is wound around the terminal pin 32. Then, the core 36 is fixed to the terminal pin 32 using solder 37, and they are electrically connected to one another. At that time, the front end of a resin insulator 38 covering the core 36 is also fixed together with the core 36 by solder 37. There are some cases, as shown in FIG. 12, that the core 36 may be fixed only using solder 37 without being wound around the terminal pin 32.

In the conventional technology, the detailed process, in which the end 34 of the wire is wound around the terminal pins 32 and 32, then soldered, is as follows:

(1) the terminal section 34 of the wire is wound around the terminal pin 32;

(2) the terminal pin 32 is dipped in a bath filled with solder 37, the terminal section 34 of the wire is temporarily fixed to the terminal pin 32 using solder 37, and they are electrically connected to one another;

(3) the core 36 of the lead 35 is twined around the terminal pin 32 having the solder 37; and (4) the terminal pin 32 is entirely dipped in the solder 37 to finally fix the end 34 and the core 36 to the terminal pin 32.

With the above processes (1) through (4), the end 34 of the wire and the core 36 are fixed to the terminal pin 32. It is designed that power is supplied to the coil component via the lead 35 from an external source.

Even when the core 36 is wound and twined around the pin 32 as shown in FIG. 11, since the pin 32 is normally not very long, the lead 35, specifically, the insulator 38 cannot be wound therearound, thus obtaining insufficient fixing strength between the pin 32 and the insulator 38. For this reason, when the lead 35 is aligned after being soldered to the pin 32, or the lead 35 is dragged around during wiring to an external machine, if the lead is pulled in the direction, to which the terminal pin is projecting, the section of the insulator 38 which is fixed by solder 37 often comes off, and a stress is directly applied to the core 36 during drawing. Since the core 36 as a single unit has a low strength compared to the core covered with the insulator 8, if a stress is directly applied to the core 36, it is highly possible that the core 36 is cut off.

OBJECT AND SUMMARY OF THE INVENTION

This invention aims primarily to provide a coil component, in which a conductive connection member such as a lead to be connected to a terminal pin is prevented from being cut off, and also to provide a motor using the coil component.

In accordance with the invention, a coil component comprises a wire, a terminal pin around which an end of the wire is wound, a terminal section for fixing one end of the terminal pin and for allowing the terminal pin to project therefrom. A conductive connection member is connected to the terminal pin so that it can be electrically connected to the wire. The terminal pin has a diameter on an open side thereof which is formed larger than that on a root side from which the conductive connection member is drawn out. The pin is formed as a contact section with which the conductive connection member makes contact when it is pulled in a projection direction of the terminal pin.

BRIEF DESCRIPTION OF THE DRAWINGS

In the drawings:

FIG. 3A is a partially magnified view of the vicinity of the terminal pin in the embodiment shown in FIG. 1; FIG. 3B is an illustration of the terminal pin in FIG. 10A viewed from the open end side;

FIG. 4 is a disassembled front view showing the coil components (lead is omitted) of FIG. 1, stored back to back in the motor case;

FIG. 7A is its plane view; FIG. 7B is a B—B cross section near the terminal pin;

FIG. 10A is a view of the stepping motor from the axial direction; FIG. 10B is a view of the terminal pin viewed from the open end side;

DESCRIPTION OF THE PREFERRED EMBODIMENTS

Figure 1:
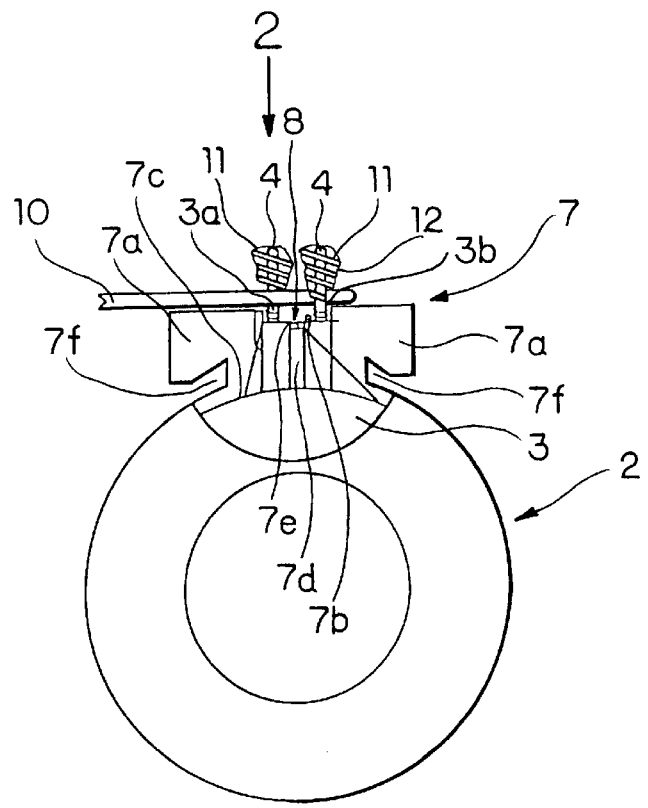
FIG. 1 is a plane view partially opening a coil component of an embodiment of this invention.
Figure 2:
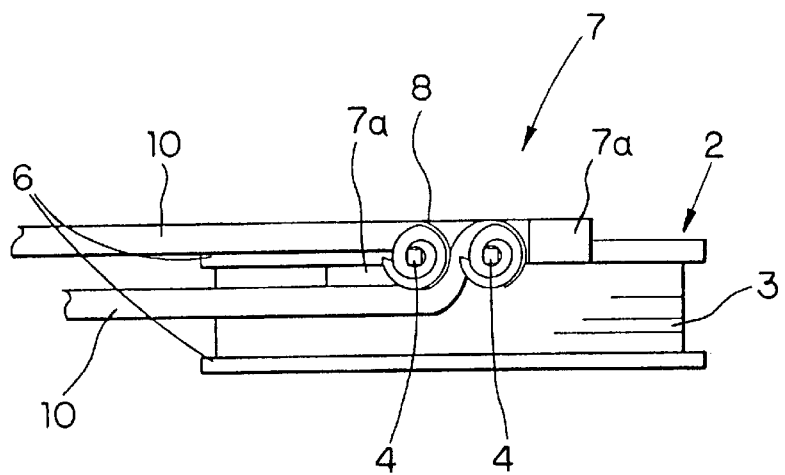
FIG. 2 is an illustration viewed from the arrow 11 direction in FIG. 1.
Figure 5:
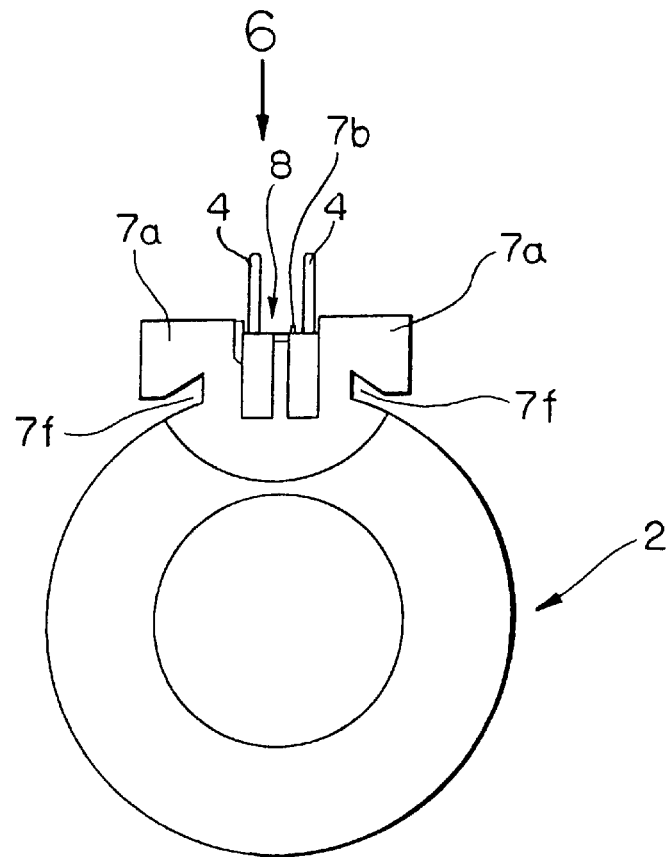
FIG. 5 is a partially opened plane view showing the coil components of FIG. 1 before the wire is wound around.
Figure 6:
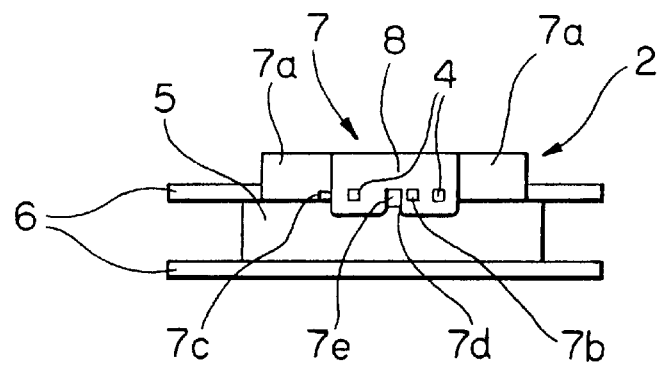
FIG. 6 is an illustration viewed from the arrow VI direction in FIG. 5.
Figure 7A:
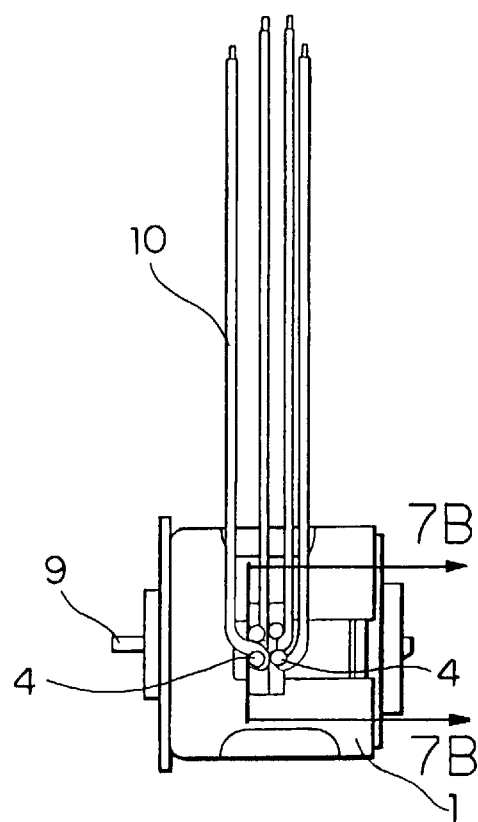
FIGS. 7A and 7B show a stepping motor in which the coil components of this invention are installed.
Figure 7B:
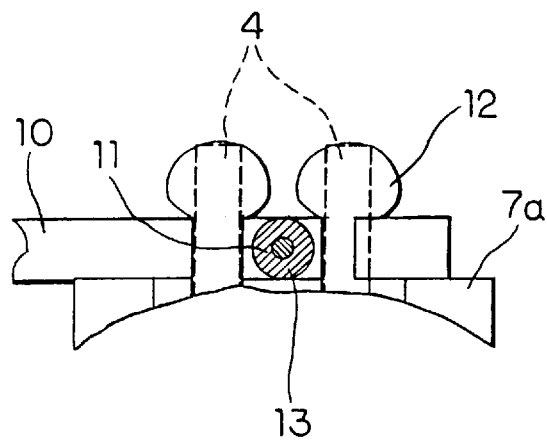

An embodiment of a coil component of this invention is described hereinafter referring to FIGS. 1 through 7. This coil component, which is installed in a stepping motor, is stored in a cup-like motor case 1. The coil component mainly consists of coil bobbins 2, conductive wire 3 wound around the coil bobbins 2, and terminal pins 4 to which the wire 3 is twined.

As shown in FIG. 4, the cup-like motor case 1 is made of metal, and a notch 1a is formed such that it is notched toward the bottom from the open edge. Two coil bobbins are stored back to back in the motor case 1.

Each of the coil bobbins 2 and 2 consists of a cylindrical spool 5, and annular flanges 6 and 6, which are integrally formed at both ends of the spool, sandwiching the spool 5. Formed on the outer periphery of one of the flanges 6 and 6 is a terminal section 7 which is projected radially and circumferentially (See FIG. 6). The two coil bobbins 2 are installed in the case 1 such that the terminal sections 7 and 7 contact one another. Note that the terminal section 7, as shown in FIG. 1, has engagement sections 7a and 7a, to which the notch 1a of the motor case 1 is fitted.

Arranged at the center of the terminal section 7 is a concave section 8 (a terminal mounting section), which is recessed toward the flange 6, being sandwiched by the engagement sections 7a and 7a. (See FIGS. 1 and 3).

When the two coil bobbins 2 and 2, which are configured in such a way, are stored side by side in the motor case 1, the terminal sections 7 and 7 are arranged such that they project from the notch 1a out of the motor case 1. In other words, the edge of the notch 1a is fitted to and engaged with grooves 7f at the engagement sections 7a and 7a of the terminal sections 7 and 7. Configured in this way, the pair of coil bobbins 2 and 2 are stored in the motor case 1 such that they are positioned and supported circumferentially. Note that in the concave section 8 (the terminal mounting section), one end of each of the two terminal pins 4 and 4 is buried such that the pins project out of the motor case 1. Further, a coil guiding pin 7b is provided in the concave section 8 to be between the terminal pins 4 and 4.

Around the outer circle of the spool 5, thin wire 3 is wound in multiple layers. The leading end 3a of the wire 3 is guided to a first guiding groove 7c provided in the terminal section 7, and wound and twined around one of the terminal pins 4. The tail end 3b of the wire 3 is guided to a second guiding groove 7d provided at the center of the terminal section 7 and to a deep guiding groove 7e following the second guiding groove 7d; then, it is hung on the guiding pin 7b, and wound and twined around the other terminal pin 4. Note that the guiding pin 7b is provided for preventing the tail end 3b from touching the notch 1a when the tail end 3b is twined around the terminal pin 4. With this, by temporarily guiding the end 3b to the center area of the terminal section 7, the end 3b can be twined around the terminal pin 4 without touching the notch 1a.

At first, the wire 3 is wound loosely around the terminal pin 4 in the concave section 8 which is a terminal mounting section. Then, the front end at the open end side of the terminal pins 4 and 4 is dipped in a solder bath (not illustrated) with the terminal pins 4 and 4 of the coil bobbin 2 facing the bottom. At that time, since the terminal pins 4 and 4 are dipped in the solder bath with only its front ends but their root section in the concave section 8, the solder does not reach the root section of the terminal pins 4 and 4 although it come up slightly above the dipping surface due to the surface tension of the solder; only a part of the ends 3a and 3b is temporarily fixed loosely, and it is electrically connected to one another. In other words, in a temporary fixing, the ends 3a and 3b are partially soldered to the terminal pins 4 and 4 only for connecting. Then, the lead 10, which is a conductive connection member for the temporarily fixed terminal pins 4 and 4, and its core 11 to be a continuity section are guided along the edge surface 7g of the engagement section 7a of the coil bobbin 2 and perpendicularly engaged with the terminal pin 4. At that time, the lead 10 and the core 11 are wound such that they do not interfere with the ends 3a and 3b, i.e., the core 11 does not overlap the ends 3a and 3b as shown in FIG. 3. As shown in FIG. 3, the diameter D2 on the open end side of the terminal pin 4 is larger compared to the diameter D1 on the winding start section, when the core 11 is wound around. In order to enlarge the diameter D2 on the open end side of the terminal pin 4, the winding condition is loose for the core 11 wound around the front end of the terminal pin 4. Then, the wound ends 3a and 3b, the lead 10 and its core 11 are dipped in the solder 12 to finalize the fixing of them. Note that the lead 10, a linear material for external connection, has a core 11 covered with insulator 13 (See FIG. 7(B)). The diameter D2 on the open end side of the terminal pins 4 and 4 when the core 11 is wound around, is larger than the diameter D1 on the root side at which the winding of the core 11 starts, i.e., from which the lead 10 is drawn out; the larger diameter section is a contact section with which the conductive connection member makes contact when the lead 10 (the conductive connection member) is pulled in the direction to which the terminal pin projects.

In this manner, the diameters of the terminal pin 4 when the core 11 is wound around, is made such that one on the open end side is larger than that on the root side; therefore, even when the conductive connection member such as the lead is pulled in the projection direction of the terminal pin, the solder for the insulator 13 is prevented from peeling off because the conductive connection member such as the lead is engaged with the contact section, i.e., the section on the open end side of larger diameter. Accordingly, the possibility is reduced in that a stress is directly applied to the core 11. Also, the ends 3a and 3b of the wire 3 are wound around the terminal pins 4 and 4 in the concave section 8 (the terminal mounting section), and the lead 10 and its core 11 are guided along the edge surface 7g of the engagement section 7a of the coil bobbin 2 and perpendicularly engaged with the terminal pin 4. For this reason, the lead 10 and its core 11 do not come into the concave section 8, thus eliminating the chance that they come off the terminal pins 4 and 4 in the concave section 8, and that they interfere with the ends 3a and 3b of the wire 3 in the concave section 8. Note that the coil bobbin 2 is stored in the motor case 1 after the lead 10 is fixed to the terminal pin 4; however, the lead 10 may be fixed to the terminal pin 4 after the coil bobbin 2 is stored in the motor case 1.

Arranged in the center hole of the spool 5 of the coil bobbin 2 is a rotor (not illustrated); an output shaft 9, which rotates integral with the rotor, projects out of the motor case 1 of the stepping motor. Further, by passing between the four terminal pins 4, the leads 10 are resistant to the external tension, and at the same time, the four leads 10 do not intertwine with one another. Power is supplied from the outside via the leads 10 and 10 to rotate the rotor and the output shaft 9.

In the coil component of this embodiment, the ends 3a and 3b of the wire 3 are wound around the terminal pin 4 in the concave section 8 (the terminal mounting section) while the lead 10 and the core 11 are wound around the portion of the terminal pin 4, which is projected out of the concave section 8. Therefore, the lead 10 and the core 11 do not interfere with the wire 3 during twining them, thus ensuring that the ends 3a and 3b are not cut off. Moreover, this makes it possible for the engagement sections 7a and 7a, used for constituting the concave section 8, to guide the ends 3a and 3b along the adjacent step, thus smoothing the winding of the ends 3a and 3b around the terminal pin 4.

In this embodiment, the notch 1a of the motor case is made large, and the terminal section 7 is made wide and high in the radius direction of the motor so that the terminal pin 4 can be surely fixed. Raising the arrangement of the terminal pin 4 may bring the possibility that the tail end 3b contacts the notch 1a of the motor case 1. However, since the end 3b is fixed to the terminal pin 4b such that it is indirectly fixed via the guiding pin 7b from the center area, not directly from the outside of the terminal pin 4b, the tail end 3b does not contact the notch 1a of the motor case 1.

Figure 8A:
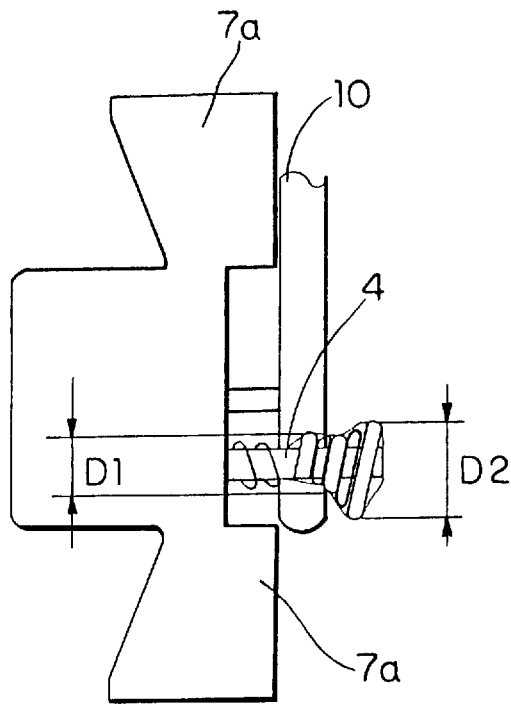
FIG. 8A is a partially magnified illustration describing the first modified example of a core with its lead fixed to the terminal pin.
Figure 8B:
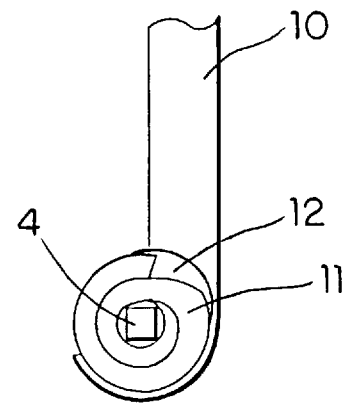
FIG. 8B is a view of the terminal pin of FIG. 8A viewed from the open end side.
Figure 9A:
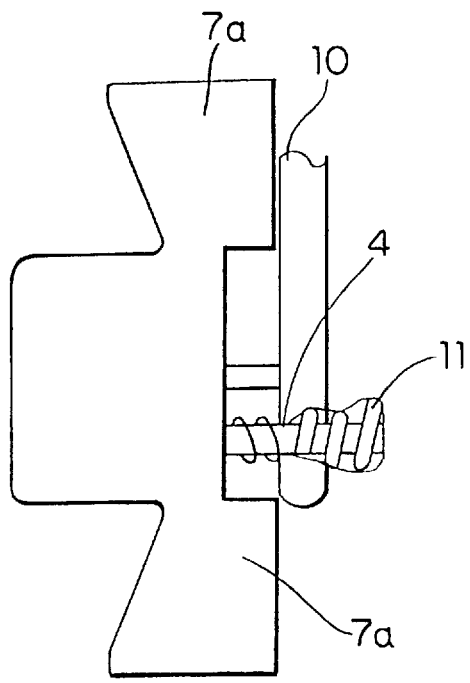
FIG. 9A is a partially magnified illustration describing the second modified example of a core with its lead fixed to the terminal pin.
Figure 9B:
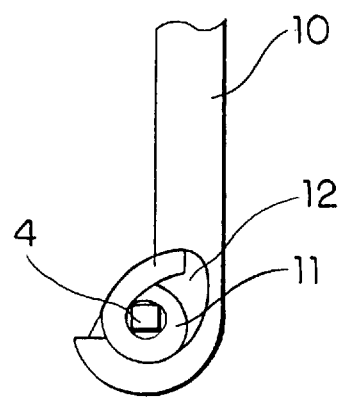
FIG. 9B is a view of the terminal pin of FIG. 9A viewed from the open end side.
Figure 10A:
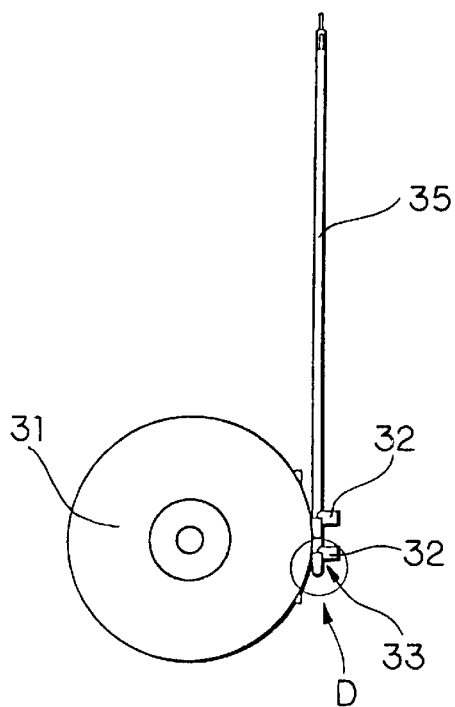
FIGS. 10A and 10B show a stepping motor in which conventional coil components are installed.
Figure 10B:
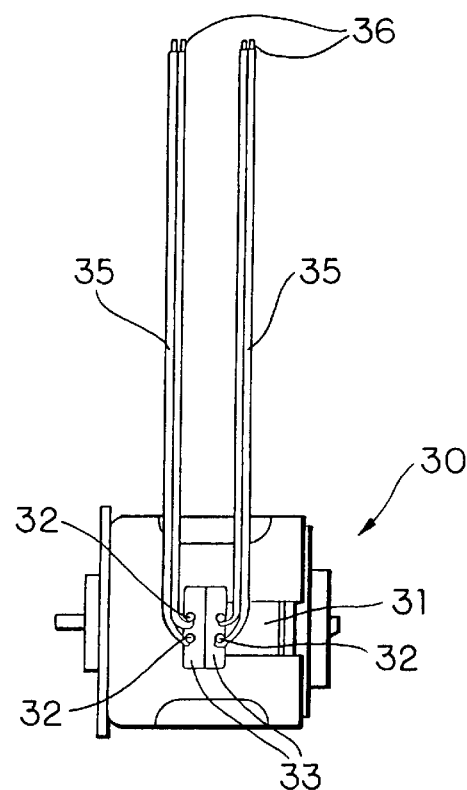
Figure 11:
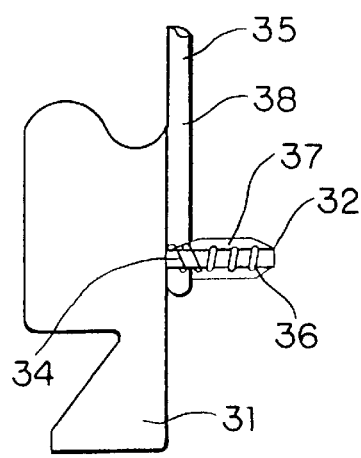
FIG. 11 is a magnified view of the vicinity of the terminal pin shown by the arrow D, describing a conventional method of connecting the lead.
Figure 12:
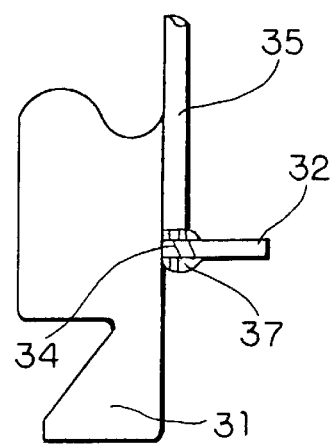
FIG. 12 is a magnified view of the vicinity of the terminal pin shown by the arrow D, describing another conventional method of connecting the lead.

The above mentioned embodiment is a preferred embodiment of this invention; however, this invention is not limited to this application. It is variously modifiable within the scope of this invention. For example, the diameter D2 on the open end side of the terminal pin 4 is made larger by loosening the twining condition in the above embodiment; however, as shown in FIG. 8, the diameter D2 on the open end side may be made larger compared to the diameter D1 at the winding start portion, by winding the core 11 overlapping in multiple on the open end side of the terminal pin 4. Also, as shown in FIG. 9, an outward projection may be formed, instead of guiding the leading end of the core 11 along the terminal pin 4, so that the diameter of the open end side may be large when the core 11 is wound around the terminal 4. Furthermore, the terminal pin 4 may be formed as a cone and its smaller diameter section be buried in the terminal section 7 to make the diameter larger for the open end side.

Since the interference of the lead 10 and its core 11 with the ends 3a and 3b in the concave section 8 is greatly reduced compared to conventional technology even if the edge of the ends 3a and 3b is out of the concave section 8, the efficiency of processing such as winding, is increased. Further, without providing the concave section 8 in the terminal section 7, an engagement section 7a may be formed only on one side of the terminal pin 4 from which the core 11 is drawn out; a convex section may be formed by raising the center area sandwiched between both terminal pins 4 and 4 in order to provide a step, which provides a lower section for arranging the terminal pins 4 and 4.

As described in the foregoing, in the coil component of this invention, the diameter on the open end side of the terminal pin is made larger than that of the root section side, from which the conductive connection member is drawn out, by enlarging the diameter of the conductive connection member, which is connected to the terminal pin, on the open end side than that on the root side of the terminal pin 4. Further, a larger diameter section formed on the open end side of the terminal pin is made as a contact section, with which the conductive connection member makes contact when it is pulled in the projection direction of the terminal pin; therefore, a stress is not applied to a fixed section of the conductive connection member even when the conductive connection member such as the lead is pulled in the projection direction of the terminal pin, eliminating the chance that the conductive connection member comes off or is loosened, and the solder is peeled off.

In addition, the motor constructed using such a coil component decreases poor electrical connections, thereby increasing reliability.

While the foregoing description and drawings represent the preferred embodiments of the present invention, it will be obvious to those skilled in the art that various changes and modifications may be made therein without departing from the true spirit and scope of the present invention.

What is claimed is:

1. A coil component comprising:

a wire;

a terminal pin around which an end of said wire is wound;

a terminal section for fixing one end of said terminal pin and for allowing said terminal pin to project therefrom;

a conductive connection member connected to said terminal pin so that said conductive connection member connected to said wire;

said conductive connection member being wound around said terminal pin such that a winding starts from a root side of said terminal pin, from which said conductive connection member is drawn out, toward an open end of said terminal pin;

said winding of said conductive connection member having a diameter formed at said open end side of said terminal pin larger than a diameter formed at said root side of said terminal pin;

said terminal pin comprising a contact section with which said conductive connection member makes contact when said conductive connection member is pulled in a projection direction of said terminal pin; and coil bobbins, said wire being wound around spools of said coil bobbins, and said terminal section being formed on a periphery of one of a pair of flanges, which are formed at both ends of said spools;

wherein a convex section, projecting longer than a fixed section at which one end of said terminal pin is fixed, is formed on a pull-out side of said conductive connection member.

2. The coil component as set forth in claim 1, wherein said terminal pin is provided in plural; and said convex section is formed between said terminal pins.

3. A coil component comprising:

a wire;

a terminal pin around which an end of said wire is wound;

a terminal section for fixing one end of said terminal pin and for allowing said terminal pin to project therefrom;

a conductive connection member connected to said terminal pin so that said conductive connection member connected to said wire;

said conductive connection member being wound around said terminal pin such that a winding starts from a root side of said terminal pin, from which said conductive connection member is drawn out toward an open end of said terminal pin;

said winding of said conductive connection member having a diameter formed at said open end side of said terminal pin larger than a diameter formed at said root side of said terminal pin;

said terminal pin comprising as a contact section with which said conductive connection member makes contact when said conductive connection member is pulled in a projection direction of said terminal pin; and coil bobbins, said wire being wound around spools of said coil bobbins, and said terminal section being formed on a periphery of one of a pair of flanges, which are formed at both ends of said spools;

wherein a concave section, which is recessed toward the flange, is formed in said terminal section, and one end of said terminal pin is fixed in said concave section.

4. A coil component comprising:

a wire;

a terminal pin around which an end of said wire is wound;

a terminal section for fixing one end of said terminal pin and for allowing said terminal pin to project therefrom;

a conductive connection member connected to said terminal pin so that said conductive connection member connected to said wire;

said conductive connection member being wound around said terminal pin such that a winding starts from a root side of said terminal pin, from which said conductive connection member is drawn out, toward an open end of said terminal pin;

said winding of said conductive connection member having a diameter formed at said open end side of said terminal pin larger than a diameter formed at said root side of said terminal pin; and said terminal pin comprising a contact section with which said conductive connection member makes contact when said conductive connection member is pulled in a projection direction of said terminal pin.

5. The coil component as set forth in claim 4, wherein said coil component has coil bobbins; said wire being wound around spools of said coil bobbins; and said terminal section being formed on a periphery of one of a pair of flanges, which are formed at both ends of said spool.

6. The coil component as set forth in claim 5, wherein said conductive connection member is a linear material used for external connection; said linear material having a conductive section formed at an end of said conductive connection member, for electrically connecting said terminal pin, and an insulator covered with insulation material; an externally drawing-out position of said linear material being formed in a vicinity of said root of said terminal pin; and when said linear material is pulled in the projection direction of said terminal pin, said insulation contacts said contact section.

7. The coil component as set forth in claim 6, wherein said terminal pin is provided in multiple; said terminal pins being formed adjacent to each other; and said insulation passes between said adjacent terminal pins.

8. A motor, wherein said coil component as set forth in claim 7 is installed in a motor case; said terminal sections being projected out of said motor case, and said conductive connection member being pulled out of said motor case.

* * * * *